US011336543B2

(12) United States Patent
Teodoro et al.

(10) Patent No.: US 11,336,543 B2
(45) Date of Patent: *May 17, 2022

(54) EDGE HMI MODULE SERVER SYSTEM AND METHOD

(71) Applicant: AVEVA Software, LLC, Lake Forest, CA (US)

(72) Inventors: Jose Lourenco Teodoro, Austin, TX (US); John Jerome Madden, Friendswood, TX (US); Douglas Paul Kane, Vashon, WA (US); Roger Santos, Austin, TX (US); David Paul Bevin, New South Wales (AU)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,536

(22) Filed: Jan. 8, 2021

(65) Prior Publication Data
US 2021/0135962 A1    May 6, 2021

Related U.S. Application Data

(63) Continuation of application No. 16/566,345, filed on Sep. 10, 2019, now Pat. No. 10,917,320.

(60) Provisional application No. 62/729,296, filed on Sep. 10, 2018.

(51) Int. Cl.
*H04L 43/045* (2022.01)
*H04L 41/0803* (2022.01)

(52) U.S. Cl.
CPC ........ *H04L 43/045* (2013.01); *H04L 41/0803* (2013.01)

(58) Field of Classification Search
None
See application file for complete search history.

(56) References Cited

U.S. PATENT DOCUMENTS

| 8,185,220 | B2 * | 5/2012 | Lloyd | G05B 19/0423 |
| | | | | 700/83 |
| 10,609,114 | B1 * | 3/2020 | Bicket | H04L 41/0246 |
| 10,917,320 | B2 * | 2/2021 | Teodoro | H04L 41/12 |
| 11,054,816 | B2 * | 7/2021 | Kane | H04L 67/306 |

(Continued)

OTHER PUBLICATIONS

International Search Report and Written Opinion for International Publication No. PCT/US2019/050406, dated Jan. 3, 2020, 9 pages.

(Continued)

*Primary Examiner* — Backhean Tiv
(74) *Attorney, Agent, or Firm* — Greenberg Traurig, LLP (57) ABSTRACT

Some embodiments include a system and method of receiving, by an edge computing device, from a server processor of a cloud platform coupled to a network, human-machine-interface logic associated with a local display of data received from a device of a distributed environment coupled to the network. Further, the system and method includes configuring the edge computing device as a human-machine-interface, coupling a data ingester and establishing a data connection to the distributed environment of the network, operating the data ingester to discover the device and receive data from the device, and processing a local graphical visualization of at least one update to the network.

20 Claims, 2 Drawing Sheets

(56) References Cited

U.S. PATENT DOCUMENTS

| | | | | |
|---|---|---|---|---|
| 2006/0212557 | A1* | 9/2006 | Rieger | H04R 21/00 709/223 |
| 2007/0057782 | A1* | 3/2007 | Wimmer | H04L 41/12 340/531 |
| 2007/0239351 | A1* | 10/2007 | Sherrill | G06Q 10/06 702/188 |
| 2008/0189246 | A1* | 8/2008 | Lloyd | G05B 23/0267 |
| 2011/0153034 | A1* | 6/2011 | Philliben | G05B 23/0216 700/17 |
| 2012/0194502 | A1 | 8/2012 | Smith et al. | |
| 2012/0254792 | A1* | 10/2012 | Husoy | G06F 3/0481 715/782 |
| 2013/0006390 | A1 | 1/2013 | Kreft et al. | |
| 2013/0211546 | A1* | 8/2013 | Lawson | H04L 67/16 700/9 |
| 2014/0129688 | A1* | 5/2014 | Asenjo | G05B 19/048 709/221 |
| 2014/0236321 | A1* | 8/2014 | Lloyd | G05B 19/056 700/83 |
| 2014/0244192 | A1* | 8/2014 | Craig | G01R 21/06 702/62 |
| 2014/0336785 | A1* | 11/2014 | Asenjo | G06F 3/048 700/17 |
| 2014/0336795 | A1* | 11/2014 | Asenjo | G05B 19/4083 700/86 |
| 2015/0074173 | A1 | 3/2015 | Thompson | |
| 2015/0277404 | A1* | 10/2015 | Maturana | G05B 15/02 700/83 |
| 2015/0372865 | A1* | 12/2015 | Schmirler | H04L 41/0813 709/221 |
| 2016/0132538 | A1* | 5/2016 | Bliss | G06F 16/20 707/741 |
| 2016/0274552 | A1* | 9/2016 | Strohmenger | G06Q 10/06 |
| 2016/0282859 | A1* | 9/2016 | Wilber | G05B 19/41875 |
| 2017/0163436 | A1* | 6/2017 | McLaughlin | H04L 67/10 |
| 2017/0336947 | A1* | 11/2017 | Bliss | G06F 3/04842 |
| 2018/0052451 | A1* | 2/2018 | Billi-Duran | G05B 19/41855 |
| 2018/0210432 | A1* | 7/2018 | You | B25J 9/161 |
| 2018/0356792 | A1* | 12/2018 | Chao | G05B 19/406 |
| 2019/0036964 | A1* | 1/2019 | Lev | H04L 63/1416 |
| 2019/0042378 | A1* | 2/2019 | Wouhaybi | H04L 69/40 |
| 2019/0050322 | A1* | 2/2019 | Bhojan | G06N 20/00 |
| 2019/0101882 | A1* | 4/2019 | Strinden | G05B 19/0426 |
| 2019/0104138 | A1* | 4/2019 | Storms | H04L 63/1425 |
| 2019/0258468 | A1* | 8/2019 | Chanda | G06F 8/60 |
| 2019/0353502 | A1* | 11/2019 | Doshi | H04L 67/12 |
| 2020/0081425 | A1* | 3/2020 | Kane | G05B 19/4183 |
| 2020/0081426 | A1* | 3/2020 | Kane | G05B 23/0272 |
| 2020/0084126 | A1* | 3/2020 | Teodoro | H04L 43/0817 |
| 2020/0265329 | A1* | 8/2020 | Thomsen | G06N 20/10 |

OTHER PUBLICATIONS

B&R Industrial Automation, "The Edge Controller—Your Industrial IoT Solution", Aug. 2018, pp. 1-30, retrieved from: <https://bonner.ie/application/files/9815/5067/2817/BR_Edge_controller_brochure.pdf>.

* cited by examiner

EDGE HMI MODULE SERVER SYSTEM AND METHOD

RELATED APPLICATIONS

This application is a Continuation Application of U.S. patent application Ser. No. 16/566,345, filed Sep. 10, 2019, which claims the benefit of and priority to U.S. Provisional Application No. 62/729,296, filed Sep. 10, 2018, entitled "EDGE HMI MODULE SYSTEM AND METHOD" the entire contents of which are incorporated herein by reference.

BACKGROUND

The "Internet of Things" provides many advantages for many applications including process control. Industry increasingly depends upon highly automated data acquisition and control systems to ensure that industrial processes are run efficiently, safely and reliably while lowering their overall production costs. Data acquisition begins when sensors measure aspects of an industrial process and periodically report their measurements back to a data collection and control system. Such measurements come in a wide variety of forms. By way of example, the measurements produced by a sensor and/or recorder include: temperature, pressure, pH, a mass and/or volume flow of material, a tallied inventory of packages waiting in a shipping line, and/or a photograph of a room in a factory. Sophisticated process management and control software examines the incoming data, produces status reports, and, in many cases, responds by sending commands to actuators and/or controllers that adjust the operation of at least a portion of the industrial process. The data produced by the sensors can also allow an operator to perform several supervisory tasks including: tailoring the process (e.g., specify new set points) in response to varying external conditions (including costs of raw materials), detecting an inefficient and/or non-optimal operating condition and/or impending equipment failure, and/or taking remedial actions, such as moving equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring and/or controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. Regarding the latter, for accuracy and to enable quick response, some of these sensors and/or control elements take one or more measurements every second. Multiplying a single sensor and/or control element by thousands of sensors and/or control elements (a typical industrial control environment) results in an overwhelming volume of data flowing into the manufacturing information and process control system. Sophisticated data management and process visualization techniques have been developed to handle the large volumes of data generated by such systems.

Highly advanced human-machine interface and/or process visualization systems exist today that are linked to data sources such as the above-described sensors and controllers. Such systems acquire and digest (e.g., filter) the process data described above. The digested process data in-turn drives a graphical display rendered by a human machine interface. Examples of such systems are the well-known Wonderware INTOUCH® human-machine interface software system for visualizing and controlling a wide variety of industrial processes. The INTOUCH® HMI empowers users to quickly and easily develop custom graphical views of their processes. Animated graphical images driven by constantly changing process data values within data streams are considerably easier for a human observer to comprehend than a stream of numbers. For this reason, process visualization systems, such as INTOUCH® software, have become key components of supervisory process control and manufacturing information systems.

However, conventional automated data acquisition and control systems are heavily dependent on cloud-based servers and databases that can cause latency delays, slow, intermittent, and/or disrupted connections. Hence, new systems could benefit from performing some process analytics and other functions including providing a human-machine-interface ("HMI") locally with the capability to perform real-time data capture, independent operational data streaming, and graphical visualizations of the data using "edge" computing capabilities.

SUMMARY

Some embodiments include a server system comprising a program logic tangibly stored on at least one non-transitory computer-readable storage medium including edge logic of at least one edge computing device configured to be coupled to a network. In some embodiments, the network includes a cloud platform configured to install a human-machine-interface functionality to the at least one edge computing device. Some embodiments include at least one processor coupled to the non-transitory computer-readable storage medium, where upon execution of at least a portion of the program logic by the at least one processor, the at least one processor is configured to process steps of a method. In some embodiments, the steps include transmitting a human-machine-interface logic from a cloud platform of the network to the at least one edge computing device.

In some embodiments, the steps include configuring the at least one edge computing device as a human-machine-interface (HMI). In some embodiments, the steps include coupling a data ingester and establishing a data connection to a distributed environment of the network. In some embodiments, the steps include operating the data ingester to discover the at least one device and receive data from the at least one device. In some embodiments, the steps include operating at least one HMI application of the human-machine-interface logic to receive one or more current state data of the at least one device. In some embodiments, the steps include, based at least in part on the one or more current state data of the at least one device, processing a graphical visualization of at least one update to at least a portion of the network.

In some embodiments, the at least one edge computing device includes software executable by the at least one processor configured to enable the at least one edge computing device to perform operations locally when connected or disconnected from one or more portions of the network.

In some embodiments, the operations include analyzing at least one characteristic of the at least one device of the distributed environment from data received from a data cache of the at least one edge computing device, and preparing a human-machine-interface module for a graphical display to at least one user.

In some embodiments, the network includes a historian module supporting data retrieval operations from the distributed environment including time-series data from the at least one device, where the time-series data comprises the one or more current state data.

In some embodiments, the one or more current state data comprises a real-time operational data of the at least one device of the distributed environment, and the at least one edge computing device includes logic configured to prepare a graphical representation based on the real-time operational data displayed by the human-machine-interface logic.

In some embodiments, the one or more current state data are generated by one or more sensor devices measuring the one or more current state data from the at least one device of the distributed environment.

In some embodiments, the network includes a historian module supporting data retrieval operations from the distributed environment including time-series data from the at least one device.

In some embodiments, the at least one device of the distributed environment includes one or more of pressure sensors, temperature sensors, motion sensors, density sensors, weight sensors, viscosity sensors, accelerometers, servos, contactors, switches, limit switches, solenoids, motors, valves, heaters, heat exchangers, pumps, fans, boilers, turbines, generators, conveyors, augers, elevators, mills, drills, presses, and manufacturing equipment.

Some embodiments include a computer-implemented method comprising the steps of: i). receiving, by at least one edge computing device, from a server processor of a cloud platform coupled to a network, human-machine-interface logic associated with a local display of data received from at least one device of a distributed environment coupled to the network; ii). using at least a portion of the human-machine-interface logic, configuring the at least one edge computing device as a human-machine-interface (HMI); iii). using at least a portion of the human-machine-interface logic, coupling a data ingester and establishing a data connection to the distributed environment of the network; iv). using at least a portion of the human-machine-interface logic, operating the data ingester to discover the at least one device and receive data from the at least one device; v). using at least a portion of the human-machine-interface logic, operating at least one HMI application to receive one or more current state data of the at least one device; and/or vi). and/or using at least a portion of the human-machine-interface logic, based at least in part on the one or more current state data of the at least one device, processing a graphical visualization of at least one update to at least a portion of the network.

In some embodiments of the method, the one or more current state data are generated by one or more sensor devices measuring the one or more current state data from the at least one device of the distributed environment.

In some embodiments of the method, the human-machine-interface logic includes a human-machine-interface and human-machine-interface configuration data. In some further embodiments of the method, at least one of steps (ii) to (vii) operate at least once without an operable data connection between the at least one edge computing device and the cloud platform. In some other embodiments of the method, the step (iv) is repeated following step (vii).

In some embodiments of the method, the at least one edge computing device includes software executable by the at least one processor configured to enable the at least one edge computing device to perform operations locally when connected or disconnected from one or more portions of the network. In some further embodiments of the method, the operations include analyzing at least one characteristic of the at least one device of the distributed environment from data received from a data cache of the at least one edge computing device, and preparing a human-machine-interface module for a graphical display to at least one user.

In some embodiments of the method, the one or more current state data are generated by one or more sensor devices measuring the one or more current state data from the at least one device of the distributed environment. In some embodiments of the method, the human-machine-interface logic includes logic configured to enable data flow between the at least one edge computing device and the at least one device regardless of operational aspects of one or more connections in the network.

In some embodiments of the method, the at least one edge computing device includes software executable by a processor of the at least one edge computing device enabling the at least one edge computing device to operate locally when connected or disconnected from one or more portions of the network. In some further embodiments of the method, the network includes a supervisory control and data acquisition (SCADA) system operationally coupled to the cloud platform and the distributed environment and configured to provide a visual representation in a graphical user interface including a display of the one or more current state data. In some embodiments of the method, the supervisory control and data acquisition (SCADA) system comprises the human-machine-interface logic.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention herein generally describe non-conventional approaches to systems and methods to data processing and management that are not well-known, and further, are not taught or suggested by any known conventional methods or systems. Moreover, the specific functional features are a significant technological improvement over conventional methods and systems, including at least the operation and functioning of a computing system that are technological improvements. These technological improvements include one or more aspects of the systems and methods described herein that describe the specifics of how a machine operates, which the Federal Circuit makes clear is the essence of statutory subject matter.

One or more of the embodiments described herein include functional limitations that cooperate in an ordered combination to transform the operation of a data repository in a way that improves the problem of data storage and updating of databases that previously existed. In particular, some embodiments described herein include system and methods for managing single or multiple content data items across disparate sources or applications that create a problem for users of such systems and services, and where maintaining reliable control over distributed information is difficult or impossible.

The description herein further describes some embodiments that provide novel features that improve the performance of communication and software, systems and servers by providing automated functionality that effectively and more efficiently manages resources and asset data for a user in a way that cannot effectively be done manually. Therefore, the person of ordinary skill can easily recognize that these functions provide the automated functionality, as described herein, in a manner that is not well-known, and certainly not conventional. As such, the embodiments of the invention described herein are not directed to an abstract idea and further provide significantly more tangible innovation. Moreover, the functionalities described herein were not imaginable in previously-existing computing systems, and did not exist until some embodiments of the invention solved the technical problem described earlier.

Some embodiments of the invention include applications that benefit from performing some process analytics and other functions locally before sending data to a cloud platform using "edge" computing. Some embodiments of the invention comprise an "Internet of Things" ("TOT") visualization capability for process and device visualization on the edge. In some embodiments, an "TOT-HMI" capability and configuration are managed from a cloud platform and deployed to an edge computing framework. In some embodiments, an edge computing module or device of the system can provide a web-based human machine interface enabling graphical visualization of real-time data flowing through an edge module to a cloud platform. In some embodiments, such a system can enable a low or reduced latency time. Further, some embodiments do not require internet connectivity to perform one or more intended functions. Some embodiments allow for continued operational visibility at a location when connectivity fails or a cloud computing system or server platform outage occurs.

Some embodiments of the "IOT-HMI" capability comprise four major components or modules including a "TOT-HMI Module", a "Current Data Cache Module", at least one "Device Discovery/Data Ingester", and a fourth module comprising a cloud-based configuration and management system of a network. Some embodiments comprise at least one edge computing device that does not need to be connected to the network during deployment configuration. Some further embodiments include an edge computing device that can self-provision itself upon next connection. Some embodiments include a common intelligent model and a Wonderware® software online component for persistent configuration storage. Some embodiments include AVEVA Insight software for visualization and manipulation of transmitted state changes.

Some embodiments relate to improved operation and visualization of data in electronic devices including, for example, a computer or computer server (e.g., such as a computer system or server functioning as a manufacturing execution system) that provides a technological solution where users can more efficiently monitor processes, retrieve, process, and view useful data. Some embodiments include a system and methods for arranging, structuring, and transmitting data or datasets in a computer or computer server using one or more data or data streams. In some embodiments, the data or datasets can comprise one or more data for visualizing alarms, alerts, status updates, and/or utilization data related to at least one asset within an HMI.

Some embodiments include one or more methods operated by program logic executed by at least one processor of a computer system that can provide an environment that allows users to utilize one or more remote or "off-premise" computing devices to visualize data or blocks of data, monitor data and alarms, status updates, and utilization including one or more transitions to or from an alarm or alert state, and/or status change, and utilization update or change (e.g., such as those that may be received from an industrial process system of a distributed environment). In some embodiments, this information may be conveyed to a user in the form of text and/or graphics in a human-machine-interface of the computing device, such as in one or more graphical user interfaces. In some embodiments, the text and/or graphics may include a variety of icons indicating different event data, storage blocks, or snapshots, alarms status updates, and utilization.

Figure 1:
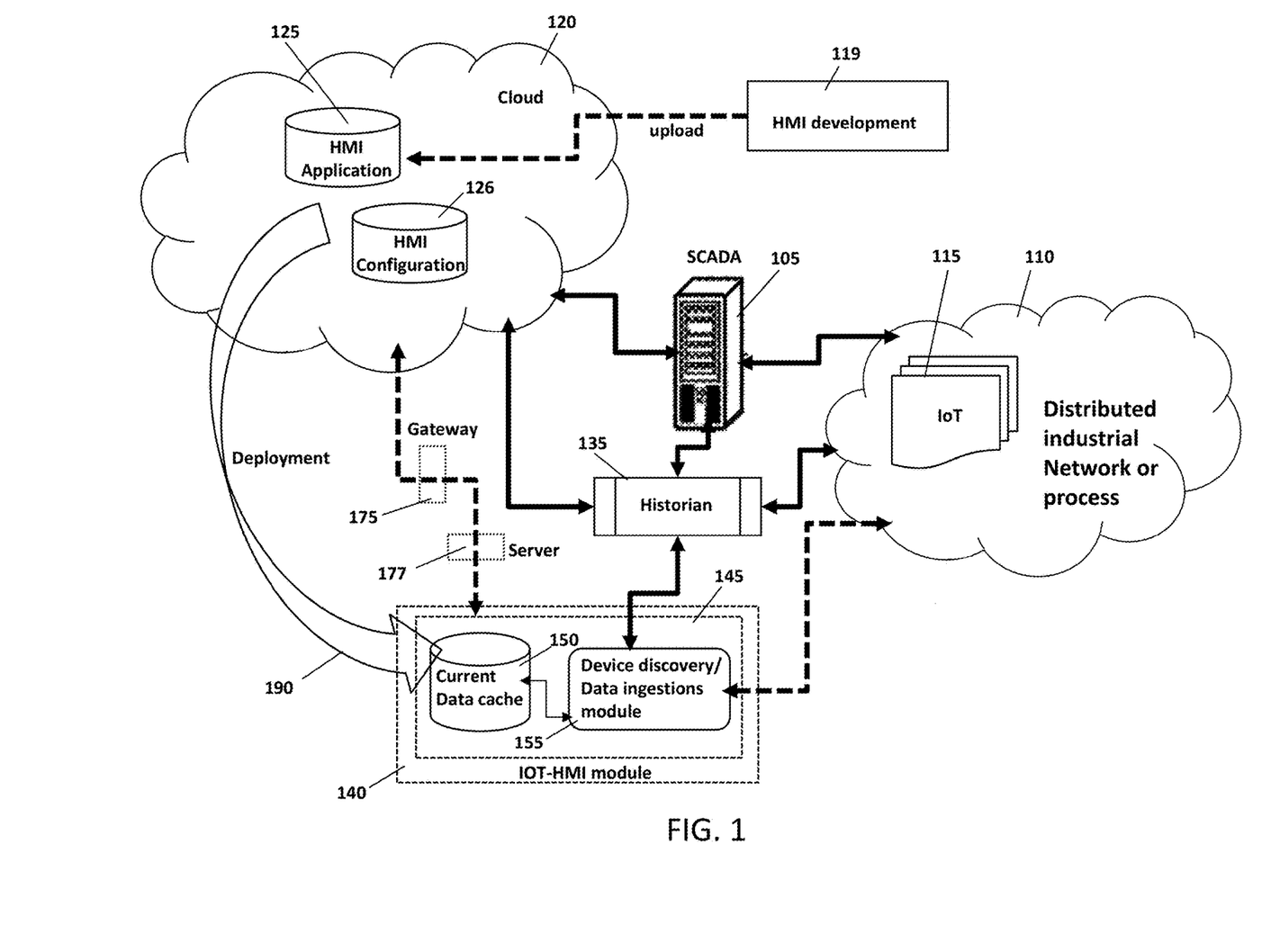
FIG. 1 illustrates a network architecture in accordance with some embodiments of the invention.

Referring to FIG. 1, illustrating a network architecture 100, some embodiments include integration of data from distributed assets in a distributed environment 110 such as equipment data specifications, maintenance records, related events, and/or drawings and piping and instrumentation diagrams integrated into a supervisory control and data acquisition (hereinafter "SCADA") system 105. In some embodiments, the distributed network 110 can include a plurality of devices 115 that may comprise a wide variety of sensors, actuators, machines, and other equipment. In some embodiments, the devices 115 may comprise pressure sensors, temperature sensors, motion sensors, density sensors, weight sensors, viscosity sensors, accelerometers, servos, and other kinds of sensors. In some further embodiments, the devices 115 may comprise contactors, switches, and limit switches. In some other embodiments, the devices 115 may comprise solenoids, motors, valves, heaters, heat exchangers, pumps, fans, boilers, turbines, generators, conveyors, augers, elevators, mills, drills, presses, and other manufacturing equipment. In some embodiments, the devices 115 may receive and/or transmit a variety of signals including analog signals and/or digital signals.

In some embodiments, the SCADA system 105 can present information to an operator or user about the utilization of a process such as one or more distributed assets including one or more distributed components of a process control and/or manufacturing information system of the aforementioned distributed environment 110. In some embodiments, the SCADA system 105 can manage and/or function as a human-machine interface ("HMI") enabling intake and processing of an operators control instructions. In some embodiments, software instructions stored on a tangible, non-transitory media and executable by a processor can receive data indicative of a manufacturing and/or process control system being monitored, and display a user interface indicative of a status of the manufacturing and/or process control system being monitored where the status is based on the received data. In addition, some logic instructions can manage a display of graphic elements as part of the user interface, where one or more of the elements is associated with and indicative of a utilization and/or status (e.g., such as an alarm status, or a specific utilization, or fault) of one or more aspects of the manufacturing/process control system being monitored. As discussed further below, in some further embodiments, an HMI function can be delegated to, transferred to, or installed to one or more edge computing devices. In some embodiments, program logic of the HMI can provide a graphical view/window representing a status or utilization of a process/plant, and/or a specific piece of equipment, and/or component, or portion thereof based upon information obtained via device integration and application objects from devices/controllers residing in the network. In some embodiments, a view engine can host individual or multiple HMI object instances corresponding to various configured process/facility views driven by information provided by, for example a connected device in the distributed environment 110.

Some embodiments include a historian module or modules 135 supporting an extensible set of advanced data retrieval operations. An example of such system is a Wonderware® historian that can collect time-series data values for observed parameters from a variety of data sources (e.g., from the distributed environment 110). The collected time-series data is thereafter deposited with the historian module or modules 135 to achieve data access efficiency and querying benefits/capabilities of the historian's database. Through its database, the historian module or modules 135 integrates plant data with event, summary, production and configuration information. A non-limiting example embodiment of the operational functions and characteristics of the historian module or modules 135 is described in more detail below.

Some embodiments include an "Internet of Things" (hereinafter "IoT") equipment HMI capability within the distributed environment 110. In some embodiments, an HMI module can monitor multiple sensor values from one or more devices 115 of the distributed environment 110, and using information stored in a cloud-based common intelligent model, uses those values to determine either or both of an equipment state or utilization of one or more devices 115 of the distributed environment 110, and/or enable a real-time or near real-time visual representation of data. Further, some embodiments of the invention enable a local low or reduced latency generation of state events with reduced traffic to and/or from a cloud-based computing system such as that defined by the cloud 120. Moreover, some embodiments of the invention can operate, function, and process data without internet connectivity. Some embodiments can enable continued use when connectivity fails or a cloud platform outage occurs. For example, in some embodiments, at least a portion of the network architecture 100 can continue to function with a local low or reduced latency generation or without internet connectivity. In some embodiments, the system performance advantages can be enabled by a scalable edge computing capability within a distributed control environment.

Some embodiments include one or more edge computing devices comprising at least one HMI module 140, each of which can comprise an edge module. For example, some embodiments comprise at least one edge module 145 for local data processing, local execution, operation, and one or more HMI capabilities as discussed earlier. Further, some embodiments comprise at least one edge cache module 150 for local storage of a current state data from one or more discovered devices, and at least one device discovery/data ingester 155 for processing incoming data from one or more discovered devices. In some embodiments, the current state data can be generated by one or more sensor devices measuring the current state data from the at least one device 115 of the distributed environment 110. In some embodiments, the current state data is real-time or near-real-time data received from one or more of the devices 115.

In some embodiments, the at least one edge module 145 can comprise program logic tangibly stored on at least one non-transitory computer-readable storage medium such as the at least one edge cache module 150. In some embodiments, at least one processor of the network architecture 100 can be coupled to the non-transitory computer-readable storage medium for execution of at least a portion of the program logic to operate a process, function, or method of the network architecture 100 including for transfer of data between the cloud 120 and the at least one edge module 145. In some embodiments, the at least one edge module 145 can provide a web-based human machine interface enabling graphical visualization of real-time data flowing through at least one edge module 145 to a cloud platform such as the cloud 120 and/or the distributed network 110.

In some embodiments, an application interface of the network architecture 100 can be accessed by executing program logic to initialize an application object. For example, in some embodiments, a logic engine of the program logic can start-up or shut-down an application object of the edge module 145, and/or initiate a scheduled execution of a corresponding application code. In some embodiments, at least a portion of the edge module 145 can include program logic that initializes an application, starts-up or shuts-down an application, and/or schedules an application, and/or attempts to initiate a data transfer protocol with at least one remote network (e.g., such as the cloud 120 and/or the distributed environment 110. For example, in some embodiments, following execution of the program logic, one or more edge computing devices can present information to an operator or user about the utilization of a process such as one or more distributed assets including one or more distributed components of a process control and/or manufacturing information system of the aforementioned distributed environment 110.

In some embodiments, an edge module 145 can manage and/or function as a human-machine interface ("HMI") enabling intake and processing of control instructions, and using software instructions stored on a tangible, non-transitory media and executable by a processor, can receive data indicative of a manufacturing/process control system being monitored, and display a user interface indicative of a status of the manufacturing/process control system being monitored. Some logic instructions of the edge module 145 can manage a display of graphic elements as part of the user interface, where one or more of the elements is associated with and/or indicative of a utilization and/or status (e.g., such as an alarm status, or a specific utilization, or fault) of one or more aspects of the manufacturing/process control system being monitored. In some embodiments, program logic of the HMI edge module 145 can provide a graphical view/window representing a status or utilization of a process/plant, and/or a specific piece of equipment, and/or component, or portion thereof based upon information obtained via device integration and application objects from devices/controllers residing in the network. In some embodiments, a view engine can host individual or multiple HMI object instances corresponding to various configured process/facility views driven by information provided by, for example a connected device in the distributed environment 110.

In some embodiments, the edge module 145 can download application or configuration data and/or updates from the cloud 120. For example, in some embodiments, a download process 190 can be initiated to download the HMI application 125, and/or the HMI configuration 126 to at least one edge module 145 of at least one HMI module 140. Further, in some embodiments, a download process 190 can be initiated to download at least one update to the HMI application 125, and/or at least one update to the HMI configuration 126 to at least one edge module 145 of at least one HMI module 140. In some embodiments, any changes or subsequent uploads from the HMI application 125, and/or the HMI configuration 126 can be automatically or specifically uploaded to the HMI module 140. The HMI module can then update itself with any application changes from the uploaded version.

In some embodiments, the HMI application and HMI capability are deployed from the cloud to on-premise (i.e., to one or more edge computing devices). Some embodiments include the ability to deploy an HMI capability from the cloud 120, connect to local devices and provide local graphical visualization of data. For example, some embodiments of the invention include local visualization of real-time data flowing through at least one edge computing device such as an edge computing device 145 of an HMI module 140.

In some embodiments, an application interface of the network architecture 100 can be accessed by executing a bootstrap logic to initialize an application object. In some embodiments, an engine of the bootstrap logic can startup an application object, and/or initiate a scheduled execution of a corresponding application code. In some embodiments, at least a portion of edge cache module 150 can include the bootstrap logic that initializes or starts an application, and/or schedules an application.

Some embodiments of the invention comprise a common intelligent model, and/or a Wonderware® online component, for persistent configuration storage. For example, in some embodiments, the historian module or modules 135 support data retrieval operations and data sharing at least one of the edge modules 145. Some embodiments include AVEVA Insight software for visualization and manipulation of transmitted state changes. For example, some embodiments include integration with one or more modules of Wonderware® INTOUCH® software.

In some embodiments, at least a portion of the logic executable by a processor of the network architecture 100 includes a historian 135 communicatively coupled to the at least one distributed environment 110, where the historian 135 is configured to enable the user to receive, store, and transmit the data or data streams. In general, the historian can store (i.e., "historize") various types of data related to at least one device or component of an industrial process. Some example data can include, but is not limited to, time-series data, metadata, event data, configuration data, raw time-series binary data, tag metadata, diagnostic log data, and the like. In some embodiments, the historian 135 can also be adapted to record trends and historical information about the industrial process for future reference. In some embodiments, the historian 135 can analyze process related data stored in an operational historian database and transform that data into timely reports that are communicated to one or more user devices. In this manner, an operational historian can filter data to raise the visibility of the data to users (e.g., via user devices). In some embodiments, the user devices can be embodied as mobile devices with a mobile application utilizing aspects of a browser-based display that can render data components including charts, trends, grids, etc.

In some embodiments, at least some program logic of the network architecture 100 can include a reporting service can be adapted to retrieve data from historian 135, detect patterns in the retrieved data, generate reports that include information about the detected patterns, and store the generated reports in the report repository, such as a database. In some embodiments, the reporting service may be provided as processor-executable instructions that comprise a procedure, a function, a routine, a method, and/or a subprogram utilized independently or in conjunction with additional aspects of network architecture 100 by computing device of the SCADA 105. In some embodiments, application specific reporting services can be based on a client application configuration, and/or the HMI of the SCADA 105 and/or the one or more HMI modules 140. In some further embodiments, the application specific reporting services can analyze incoming data using algorithms and to detect certain patterns (e.g., "pattern of interest") and/or non-conformities in the data for reporting and/or for triggering an alarm and/or reporting a specific utilization. For example, some algorithms include statistical algorithms, machine learning algorithms, rules-based algorithms, mapping algorithm or rules, and the like, capable of detecting certain patterns.

In a non-limiting example embodiment, a report or update, including any report or update processed by an HMI module 140 in real-time or near real-time can include text, graphics (e.g., graphs, images, etc.), and/or metadata, and/or one or more alarms or alarm data, and/or one or more utilization characteristics flowing through the edge module 145 from at least one device of the plurality of devices 115 after intake into the device discovery/data ingester 155. In some embodiments, the reports or updates may include the information about the detected patterns in a format that is amenable to the curating service and/or a format that is human-understandable when displayed via a display device and/or an HMI including, without limitation, the edge module 145.

In some embodiments of the invention, the HMI application 125 and/or HMI configuration 126 can be developed using HMI development tools 119 and uploaded to the cloud 120. In some embodiments, any changes or subsequent uploads from the HMI development tools 119 can be automatically or specifically uploaded to the HMI module 140. The HMI module can then update itself with any application changes from the uploaded version.

In some embodiments, the HMI application 125 and/or HMI configuration 126 can be assigned to at least one edge module 145 even when those devices are offline. Some embodiments include a software module assigned to at least one edge module 145 that can self-configure, and/or download itself to one or more applicable HMI module 140. Further, some embodiments include a software module of at least one edge module 145 that can operate locally and continue to function even if disconnected from one or more portions of the network architecture 100, including, but not limited to, the cloud 120. Some embodiments include a local low latency generation of utilization events with reduced traffic to the cloud 120.

In some embodiments, at least one HMI module 140 can couple to a network of the network architecture 100 using any fixed or mobile computing device that can be wired and/or wirelessly coupled to the Internet or through an Intranet and/or Ethernet, including, but not limited to, personal digital assistants, and/or cellular phones, mobile phones, or smart phones, and/or pagers, and/or digital tablets, and/or fixed or mobile internet appliances. In some embodiments, one or more components of the network architecture 100 can include numerous user devices which can be personal computers including for example desktop computers, laptop computers, digital assistants, personal digital assistants, cellular phones, mobile phones, smart phones, pagers, digital tablets, internet appliances, vehicular displays, wearable displays, virtual reality viewing devices such as virtual reality headsets, virtual reality glasses, and the like and other processor-based devices.

In some embodiments, data connections or transfers within the network architecture 100 can include one or more gateways, servers, and/or firewalls. For example, in some embodiments, a connection between one or more of edge modules 145 can include a gateway 175 and/or server 177. In some embodiments, any one or more of the connections and/or data transfers of the network architecture 100 can include a gateway 175 and/or server 177, and/or at least one firewall.

Figure 2:
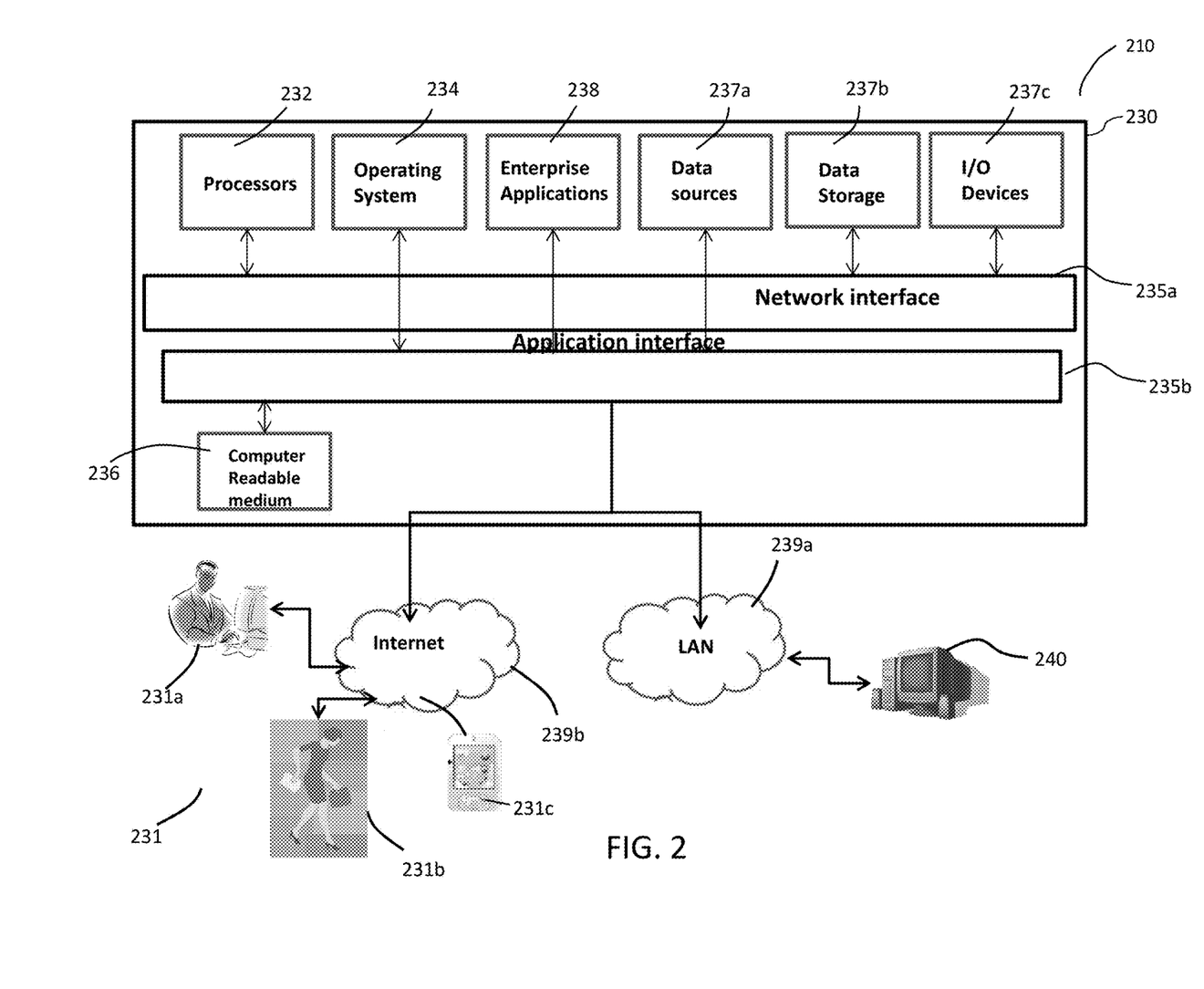
FIG. 2 illustrates a computer system comprising or included with or in the network architecture of FIG. 1 according to at least one embodiment of the invention.

Referring to FIG. 2, in some embodiments, the computer system 210 can include and/or operate and/or process computer-executable code of one or more of the above-mentioned software modules and/or systems. Further, in some embodiments, the computer system 210 can operate and/or display information within one or more graphical user interfaces such as the GUI of FIG. 2. In some embodiments, the computer system 210 can comprise the cloud and/or can be coupled to one or more cloud-based server systems. In some embodiments, the system 210 can comprise at least one computing device including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as one or more enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that the invention can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on computer-readable storage media within the system 210 and on computer-readable storage media coupled to the system 210. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the system 210 can comprise at least one computer readable medium 236 coupled to at least one data source 237a, and/or at least one data storage device 237b, and/or at least one input/output device 237c. In some embodiments, the invention can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, the computer readable medium 236 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 236 can transmit or carry instructions to a computer 240 and/or at least one user 231, including a router, private or public network, or other transmission device or channel, both wired and wireless. In some embodiments, the software modules 238 can be configured to send and receive data from a database (e.g., from a computer readable medium 236 including data sources 237a and data storage 237b that can comprise a database), and data can be received by the software modules 238 from at least one other source. In some embodiments, at least one of the software modules 238 can be configured within the system to output data to at least one user 231 via at least one graphical user interface rendered on at least one digital display.

In some embodiments of the invention, the computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include at least one computer 240 coupled through the LAN 239a that can be configured for any type of user including an administrator.

Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some further embodiments, the user 231 can comprise a mobile user 231b coupled to the system 210. In some embodiments, the user 231b can use any mobile computing device 231c to wireless coupled to the system 210, including, but not limited to, personal digital assistants, and/or cellular phones, mobile phones, or smart phones, and/or pagers, and/or digital tablets, and/or fixed or mobile internet appliances.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

For the purposes of this disclosure the term "server" should be understood to refer to a service point which provides processing, database, and communication facilities. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as a Microsoft® Windows® Server, Mac OS X, Unix, Linux, and/or any other conventional operating system.

For the purposes of this disclosure a "network" should be understood to refer to a network that may couple devices so that communications may be exchanged, such as between a server and a client device, peer to peer communications, or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, "Integrated Services Digital Networks" (ISDNs), "Digital Subscriber Lines" (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple user or client devices with a network. A wireless network may employ stand-alone ad-hoc networks, mesh networks, wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including "Long Term Evolution" (LTE), WLAN, wireless router (WR) mesh, or 2nd, 3rd, 4th, or 5th generation (2G, 3G, 4G, or 5G)

cellular technology, or the like. Network access technologies may enable wide area coverage for devices, such as client devices with varying degrees of mobility, for example. For example, a network may enable RF or wireless type communication via one or more network access technologies, such as "Global System for Mobile communication" (GSM), "Universal Mobile Telecommunications System" (UMTS), "General Packet Radio Services" (GPRS), "Enhanced Data GSM Environment" (EDGE), 3GPP LTE, LTE Advanced, "Wideband Code Division Multiple Access" (WCDMA), Bluetooth®, 802.11b/g/n, or the like. A wireless network may include virtually any type of wireless communication mechanism by which signals may be communicated between devices, such as a client device or a computing device, between or within a network, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a near field communication (NFC) device, a personal digital assistant (PDA), a handheld computer, a tablet computer, a phablet, a laptop computer, a set top box, a wearable computer, an integrated device combining various features, such as features of the forgoing devices, or the like.

A client device may vary in terms of capabilities or features, and claimed subject matter is intended to cover a wide range of potential variations. A web-enabled fixed or mobile device may include a browser application that is configured to receive and to send web pages, web-based messages, and the like. The browser application may be configured to receive and display graphics, text, multimedia, and the like, employing virtually any conventional web-based language. In some embodiments, one or more services of any of the systems described herein can be hosted/consumed in an HTML5 compatible browser. However, other embodiments can include wrapping the service up in a C# component that embeds the NVDEC decoder i.e. not use a browser control. In some embodiments, the service presents an API supporting zoom to/highlighting, and/or picking return of a selected tag identifier/name.

It is noted that the network architecture 100 depicted in FIG. 1 and described hereinabove is merely an example of a system including a multi-layered hierarchical architecture for a supervisory process control and manufacturing information system. It is further noted that FIG. 1 is presented as a logical view of the hosting and/or containment interrelations between installed components including software and physical computing hardware. The system disclosed herein is suitable for virtually any network topology. For example, some embodiments of the invention are applicable to a system wherein both configuration utility and supervisory process control visualization applications run on a single computer system linked to a controlled process. Further, although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the description and claims herein.

The invention claimed is:

1. A server system comprising;
program logic tangibly stored on at least one non-transitory computer-readable storage medium, the program logic including edge logic of at least one edge computing device configured to be coupled to a network, the network including a cloud platform configured to install a human-machine-interface functionality to the at least one edge computing device;
at least one processor coupled to the non-transitory computer-readable storage medium, wherein upon execution of at least a portion of the program logic by the at least one processor, the at least one processor is configured to execute steps including:
configuring the at least one edge computing device as a human-machine-interface;
coupling a data ingester and establishing a data connection to a distributed environment of the network;
operating the data ingester to receive data from the at least one edge computing device;
operating at least one human-machine-interface application of the human-machine-interface logic to receive one or more current state data of the at least one edge computing device; and
based at least in part on the one or more current state data of the at least one edge computing device, processing a graphical visualization of at least one update to at least a portion of the network.

2. The server system of claim 1, wherein the at least one edge computing device includes software executable by the at least one processor configured to enable the at least one edge computing device to perform operations locally when connected or disconnected from one or more portions of the network.

3. The server system of claim 2, wherein the operations include analyzing at least one characteristic of the at least one device of the distributed environment from data received from a data cache of the at least one edge computing device, and preparing a human-machine-interface module for a graphical display to at least one user.

4. The server system of claim 1, wherein the network includes a historian module supporting data retrieval operations from the distributed environment including time-series data from the at least one device, wherein the time-series data comprises the one or more current state data.

5. The server system of claim 1, wherein the one or more current state data comprises real-time operational data of the at least one device of the distributed environment, and the at least one edge computing device includes logic configured to prepare a graphical representation based on the real-time operational data displayed by the human-machine-interface logic.

6. The server system of claim 1, wherein the one or more current state data are generated by one or more sensor devices measuring the one or more current state data from the at least one device of the distributed environment.

7. The server system of claim 1, wherein the network includes a historian module supporting data retrieval operations from the distributed environment including time-series data from the at least one device.

8. The server system of claim 1, wherein the at least one device of the distributed environment includes one or more of pressure sensors, temperature sensors, motion sensors, density sensors, weight sensors, viscosity sensors, accelerometers, servos, contactors, switches, limit switches, solenoids, motors, valves, heaters, heat exchangers, pumps, fans, boilers, turbines, generators, conveyors, augers, elevators, mills, drills, presses, and manufacturing equipment.

9. A computer-implemented method comprising the steps of:
   i) receiving, by at least one edge computing device, from a server processor of a cloud platform coupled to a network, human-machine-interface logic associated with a local display of data received from at least one device of a distributed environment coupled to the network;
   ii) using at least a portion of the human-machine-interface logic, configuring the at least one edge computing device as a human-machine-interface;
   iii) using at least a portion of the human-machine-interface logic, coupling a data ingester and establishing a data connection to the distributed environment of the network;
   iv). using at least a portion of the human-machine-interface logic, operating the data ingester to receive data from the at least one device;
   v). using at least a portion of the human-machine-interface logic, operating at least one human-machine-interface application to receive one or more current state data of the at least one device; and
   vi). using at least a portion of the human-machine-interface logic, based at least in part on the one or more current state data of the at least one device, processing a graphical visualization of at least one update to at least a portion of the network.

10. The computer-implemented method of claim 9, wherein the one or more current state data are generated by one or more sensor devices measuring the one or more current state data from the at least one device of the distributed environment.

11. The computer-implemented method of claim 9, wherein the human-machine-interface logic includes a human-machine-interface and human-machine-interface configuration data.

12. The computer-implemented method of claim 9, wherein at least one of steps (ii) to (vi) operate at least once without an operable data connection between the at least one edge computing device and the cloud platform.

13. The computer-implemented method of claim 9, wherein step (iv) is repeated following step (vi).

14. The computer-implemented method of claim 9, wherein the at least one edge computing device includes software executable by the at least one processor configured to enable the at least one edge computing device to perform operations locally when connected or disconnected from one or more portions of the network.

15. The computer-implemented method of claim 9, wherein the operations include analyzing at least one characteristic of the at least one device of the distributed environment from data received from a data cache of the at least one edge computing device, and preparing a human-machine-interface module for a graphical display to at least one user.

16. The computer-implemented method of claim 9, wherein the one or more current state data are generated by one or more sensor devices measuring the one or more current state data from the at least one device of the distributed environment.

17. The computer-implemented method of claim 9, wherein the human-machine-interface logic includes logic configured to enable data flow between the at least one edge computing device and the at least one device regardless of operational aspects of one or more connections in the network.

18. The computer-implemented method of claim 9, wherein the at least one edge computing device includes software executable by a processor of the at least one edge computing device enabling the at least one edge computing device to operate locally when connected or disconnected from one or more portions of the network.

19. The computer-implemented method of claim 9, wherein the network includes a supervisory control and data acquisition (SCADA) system operationally coupled to the cloud platform and the distributed environment and configured to provide a visual representation in a graphical user interface including a display of the one or more current state data.

20. The computer-implemented method of claim 19, wherein the supervisory control and data acquisition (SCADA) system comprises the human-machine-interface logic.

* * * * *